UNITED STATES PATENT OFFICE.

ANDREW BERGMAN, OF CHICAGO, ILLINOIS.

BUTTERIN AND METHOD OF MAKING SAME.

SPECIFICATION forming part of Letters Patent No. 722,276, dated March 10, 1903.

Application filed October 27, 1902. Serial No. 129,010. (Specimens.)

*To all whom it may concern:*

Be it known that I, ANDREW BERGMAN, a subject of the King of Sweden and Norway, residing at Chicago, in the county of Cook and State of Illinois, have invented certain new and useful Improvements in Butterin and Method or Process of Making the Same; and I do declare the following to be a full, clear, and exact description of the invention, such as will enable others skilled in the art to which it appertains to make and use the same.

This invention relates to new and useful improvements in a process of making butterin without the use of an additional coloring-matter; and it consists in the combination of ingredients which will form a wholesome product having the natural color of creamery-butter.

In carrying out the invention I employ fifty per cent. pure lard, thirty per cent. of eggs, and twenty per cent. of tallow. In preparing the ingredients the lard and tallow may be melted either separately or together, it being desirable to raise the temperature of the lard to 60° Fahrenheit, and when melted the whites and yolks of eggs are beaten for from fifteen to thirty minutes and are then mixed with the molten tallow and lard. The ingredients being thus compounded, the mixture is submitted to a steam or other heat and allowed to boil for from fifteen to thirty minutes. After the ingredients have been boiled for from fifteen to thirty minutes the mixture is transferred to a tank, where it is allowed to cool off. During the time that the mixture is cooling off a constant stirring is kept up, and afterward the mixture is mixed with salt in the regular manner by means of a butter-machine.

The product resulting from the carrying out of my process is of the consistency of butter and has the natural coloring of prime butter or of the best grades of butterin now upon the market.

Having thus described my invention, what I desire to secure by Letters Patent is—

1. The process of making butterin, consisting in melting lard and tallow in the proportion of fifty per cent. of the former to twenty per cent. of the latter, and mixing thirty per cent. of eggs thoroughly beaten together, and submitting the mixture to heat and boiling the same for from fifteen to thirty minutes, and afterward transferring the mixture to a cooling-tank and agitating the same preparatory to its being worked in a butter-machine, as set forth.

2. As an improved article of manufacture, a butterin consisting of substantially fifty per cent. of lard, twenty per cent. of tallow and about thirty per cent. of eggs, and salt, substantially as set forth.

In testimony whereof I hereunto affix my signature in presence of two witnesses.

ANDREW BERGMAN.

Witnesses:
ROBERT W. STEWART,
HILMA ISORA BERGMAN.